United States Patent
Bizhong et al.

(10) Patent No.: US 9,975,097 B2
(45) Date of Patent: May 22, 2018

(54) FOOD PREPARATION DEVICE WITH STIRRING SYSTEM

(71) Applicant: Lembak Global Sourcing LLC, Brookfield, WI (US)

(72) Inventors: Ruan Bizhong, Shanghai (CN); Xie Chunlei, Pujiang Town (CN)

(73) Assignee: Lembak Global Sourcing LLC, Brookfield, WI (US)

( * ) Notice: Subject to any disclaimer, the term of this patent is extended or adjusted under 35 U.S.C. 154(b) by 54 days.

(21) Appl. No.: 15/074,182

(22) Filed: Mar. 18, 2016

(65) Prior Publication Data

US 2016/0367952 A1    Dec. 22, 2016

Related U.S. Application Data

(60) Provisional application No. 62/235,287, filed on Sep. 30, 2015.

(30) Foreign Application Priority Data

Mar. 19, 2015   (CN) .......................... 2015 3 0066355
Mar. 19, 2015   (CN) .......................... 2015 3 0066356
Mar. 20, 2015   (CN) ..................... 2015 2 0158989 U

(51) Int. Cl.
*B01F 7/20*   (2006.01)
*B01F 7/00*   (2006.01)
(Continued)

(52) U.S. Cl.
CPC ........ *B01F 15/00506* (2013.01); *A23L 7/187* (2016.08); *B01F 7/00325* (2013.01); *B01F 7/165* (2013.01); *A23V 2002/00* (2013.01)

(58) Field of Classification Search
CPC .................................................. B01F 7/1695
See application file for complete search history.

(56) References Cited

U.S. PATENT DOCUMENTS 110,916 A    1/1871   Hoijcke et al.
876,786 A    1/1908   Emmer
(Continued)

FOREIGN PATENT DOCUMENTS

CN    201403454 Y    2/2010
CN    202425545 U    9/2012

OTHER PUBLICATIONS

"Antique Vintage Corn Popper Popcorn Maker Stove Crank Handle," Antiques Navigator, http://www.antiquesnavigator.com/d-839380/antique-vintage-corn-popper-popcorn-maker-stove-top-pot-crank-handle.html, Jan. 2, 2012, 2 pp.
(Continued)

*Primary Examiner* — Tony G Soohoo
*Assistant Examiner* — Elizabeth Insler
(74) *Attorney, Agent, or Firm* — Boardman & Clark LLP

(57) ABSTRACT

A food preparation device with a stirring mechanism is disclosed. The food preparation device includes a container having an attached handle, an aperture extending longitudinally through the handle and through a sidewall of the container, a crank shaft extending through the aperture, and having a hand crank on a first end of the crank shaft, the second end of the crank shaft extending into the container and removably connecting to a horizontal drive shaft, the horizontal drive shaft being engaged with a gear assembly that translates rotational movement from the horizontal crank shaft and drive shaft to rotational movement of a vertical agitation shaft engaged with the gear assembly. The crank shaft is removable from the horizontal drive shaft and the agitation assembly via a quick connect/disconnect mechanism. A rigid transparent lid separable from the container is also provided. An agitation assembly is also disclosed.

18 Claims, 15 Drawing Sheets

(51) Int. Cl.
*B01F 15/00* (2006.01)
*A23L 7/187* (2016.01)
*B01F 7/16* (2006.01)

(56) References Cited

U.S. PATENT DOCUMENTS

| | | |
|---|---|---|
| 912,136 A | 2/1909 | Landry |
| 1,178,520 A | 4/1916 | Johnston |
| 1,344,836 A | 6/1920 | Walden |
| 1,620,765 A | 3/1927 | Jackson et al. |
| 1,689,265 A | 10/1928 | Walker et al. |
| D82,260 S | 10/1930 | Harry |
| D83,326 S | 2/1931 | Harry |
| 1,974,611 A | 9/1934 | Gundelfinger et al. |
| D96,776 S | 9/1935 | Stephen |
| 2,034,190 A | 3/1936 | Platt et al. |
| 2,279,750 A | 4/1942 | Gundelfinger et al. |
| 2,505,967 A | 5/1950 | Humphrey et al. |
| D159,138 S | 6/1950 | Raymond |
| 2,561,203 A | 7/1951 | Morris et al. |
| 4,149,455 A | 4/1979 | Ross et al. |
| 4,202,256 A | 5/1980 | Brooks et al. |
| 4,576,089 A | 3/1986 | Chauvin |
| 4,763,567 A | 8/1988 | Jacobsen et al. |
| 5,938,325 A | 8/1999 | Edwards |
| 7,677,792 B2 | 3/2010 | Saunders et al. |
| D636,215 S | 4/2011 | Cloutier et al. |
| 8,066,427 B2 * | 11/2011 | Wong ............... B01F 7/00208 366/276 |
| 8,434,403 B1 | 5/2013 | Sasken-Duff et al. |
| 2004/0194633 A1 * | 10/2004 | Bourne ............... A23L 7/187 99/323.5 |
| 2005/0056154 A1 | 3/2005 | Fu et al. |

OTHER PUBLICATIONS

"Stirlt Launches Website for Pot Stirrer," HomeWorld Business, http://www.homeworldbusiness.com/Kitchenware/Stirlt-Launches-Website-for-Pot-Stirrer/24654, May 19, 2014, 2 pp.
Carstens, Erin, "Stirio—Automatic Pot Stirrer", Dude!!! I want that, http://www.dudeiwantthat.com/household/kitchen/stirio-automatic-pot-stirrer.asp, Nov. 29, 2013, 2 pp.
Gamganny, "The Automatic Pot Stirrer", HubPages, http://gamganny.hubpages.com/hub/automatic-pot-stirrer, May 25, 2013, 2 pp.
"The Whirley Pop Popcorn Maker, Stove Top Popcorn Popper," WhirleyPopShop.com, http://www.whirleypopshop.com/stovetop-poppers.html, Mar. 13, 2015, 2 pp.

* cited by examiner

FOOD PREPARATION DEVICE WITH STIRRING SYSTEM

CROSS-REFERENCE TO RELATED APPLICATIONS

This application claims priority to U.S. Provisional Patent Application Ser. No. 62/235,287, filed Sep. 30, 2015, entitled FOOD PREPARATION DEVICE WITH STIRRING SYSTEM, claims priority to Chinese Patent, Serial No. Z1.2015 3 0066355.6, filed Mar. 19, 2015, claims priority to Chinese Patent, Serial No. Z1 2015 3 0066356.0, filed Mar. 19, 2015, and claims priority to Chinese Patent, Serial No. Z1 2015 2 0158989.9, filed Mar. 20, 2015, the entire contents of each of which is hereby incorporated by reference herein in their entirety.

FIELD

The present inventions relate to the field of devices used for food preparation. The present inventions more specifically relate to the field of devices for agitating and mixing food.

BACKGROUND

Popcorn popping appliances and manual popcorn popping pans are well known. These corn popping appliances/manual devices are useful in that they provide a means for agitating and mixing popcorn kernels to allow even heat distribution and burn avoidance while allowing the operator to avoid holding one's hand above a burner. However, these existing appliances, and in particular manual popcorn popping pans, do not easily and quickly allow full removal of the crank mechanism, stable operation of the device, or easy viewing of, and contained cooking and heating of, the contained food. As a result, these appliances or devices are difficult to clean, and many are not suitable for cleaning in a dishwasher. Moreover, many kitchen owners suffer from a lack of storage space, such that a single-use appliance used only for a specific purpose takes up precious space. The ability to convert the device to allow many uses is appreciated, and needed, by many users.

In the field of popcorn popping, it is well known that the most desirable popcorn is popped at a high temperature with the addition of hot oil or other hot grease to obtain optimum results for popcorn. However, this presents a danger to the operator if the device is not stable. Instability increases as the device incorporates movement, but burning of food product contained therein is almost certain if there is no movement to agitate and move the food product inside. This presents a need to stabilize any mechanism used to agitate the food to prevent the device from tipping or spilling and to contain the hot contents. Existing devices have an agitation mechanism connected to the lid. However, this increases the probability of the lid being moved or separated from the bottom portion of the device during the agitation process, increasing the chances of spilling and splattering the hot contents, injuring the operator and anyone else nearby.

It is also important to be able to contain the oil and grease along with its associated splatter, while being able to observe the food cooked therein. Screens do not prevent splatter, but only lessen spatter while obscuring the view, and solid lids prohibit the view altogether. While clear lids have been used in some devices, an agitation mechanism is incorporated in the lid which has multiple disadvantages, namely, it obscures the view, requires the operator's hands to be over the hot device, and is easily knocked off or moved while moving the disclosed crank adding to the risk of spills.

SUMMARY

Accordingly, an improved food preparation device with a stirring mechanism is provided. The device may be used to prepare food. While disclosed for use with popcorn herein, the device may also be used for other purposes, such as for example roasting coffee beans, cooking food which requires stirring, and the like, when incorporating the agitating mechanism.

More specifically, a food preparation device is disclosed. The food preparation device has a receptacle with a substantially planar bottom, a substantially vertical, annular sidewall having one edge in continuous contact with the bottom, an annular rim in continuous contact with the sidewall, vertically opposed to the bottom, and a handle projecting from the annular sidewall. The food preparation device also has a removable agitation assembly including a crank shaft extending substantially parallel to a plane defined by the substantially planar bottom of the receptacle and extending through the handle into the receptacle, wherein the crank shaft has a first axis of rotation. A rotating handle is attached to the crank shaft, wherein the rotating handle is configured to be rotated by a user to rotate the crank shaft about the first axis of rotation. A drive shaft having the same first axis of rotation and in line with the crank shaft is also provided, wherein the drive shaft removably connects to the crank shaft on one end such that rotation from the crank shaft is transferred to the drive shaft. An agitation shaft is provided substantially perpendicular to the plane defined by the bottom of the receptacle, the agitation shaft having a second axis of rotation. A gear assembly is mechanically linked to the drive shaft and to the agitation shaft to transfer rotation about the first axis of rotation to the second axis of rotation. At least one paddle is provided proximate the bottom of the receptacle and coupled to the agitation shaft. A stabilizing assembly, formed by a support frame circumnavigating the crank shaft, drive shaft, and gear assembly, removably engages the annular sidewall.

A food preparation device with a stirring mechanism is also disclosed. The food preparation device includes a container having an attached handle, an aperture extending longitudinally through the handle and through a sidewall of the container, a crank shaft extending through the aperture, and having a hand crank on a first end of the crank shaft, the second end of the crank shaft extending into the container and removably connecting to a horizontal drive shaft, the horizontal drive shaft being engaged with a gear assembly that translates rotational movement from the horizontal crank shaft and drive shaft to rotational movement of a vertical agitation shaft engaged with the gear assembly. The crank shaft is removable from the horizontal drive shaft and the agitation assembly via a quick connect/disconnect mechanism. A rigid transparent lid separable from the container is also provided.

An agitation assembly for a food preparation device is also disclosed. The agitation assembly has a drive shaft with a first axis of rotation. The drive shaft is removably connectable to a crank shaft on one end such that rotation from the crank shaft is transferred to the drive shaft. An agitation shaft is also provided having a second axis of rotation. A gear assembly mechanically links the drive shaft and the agitation shaft to transfer rotation about the first axis of rotation to the second axis of rotation. At least one paddle is coupled to the agitation shaft. A stabilizing assembly is also provided which is formed by a support frame circumnavigating drive shaft and gear assembly, wherein the stabilizing assembly is removably engageable with the food preparation device.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein.

Figure 1:
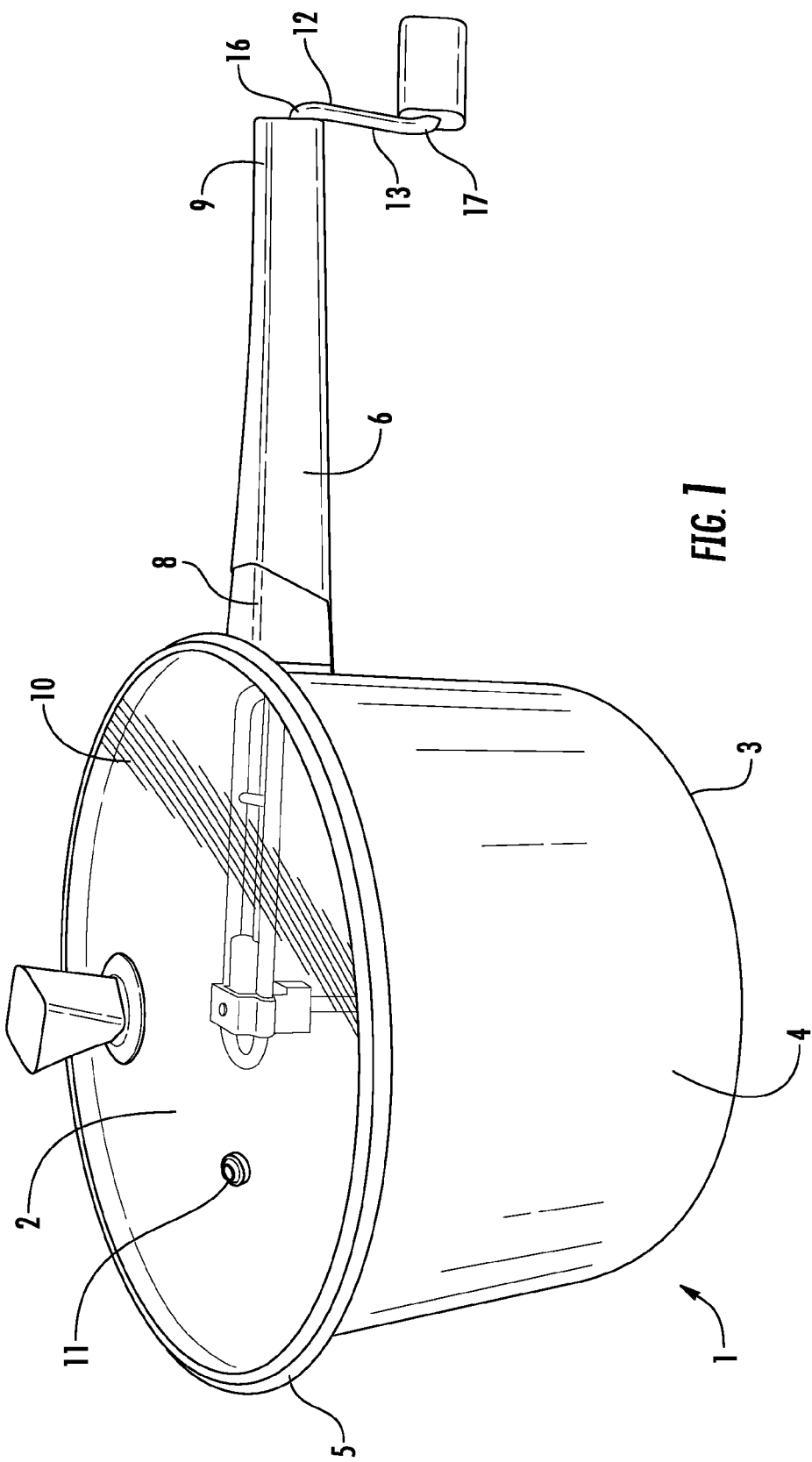
FIG. 1 is a perspective view of the device showing the container, lid, stabilizing assembly, crank handle, crank shaft, and drive shaft.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

The device generally includes a container approximately the size of a sauce pan with a handle attached to the pan, although variations in size may be acceptable. The container has a rigid lid or cover, which in one embodiment may be a transparent lid, e.g., of tempered glass, but may be of other heat-resistant, transparent materials well-known in the art. An aperture extends longitudinally through the handle and through a sidewall of the container. An agitation assembly is joined to the container. More specifically, a rod or crank shaft extends through the aperture. On the first end of the crank shaft is a hand crank or knob for manually rotating the crank shaft. The second end of the crank shaft extends into the container and removably connects to a horizontal drive shaft. The horizontal drive shaft engages with a gear assembly that translates the rotational movement from the horizontal crank shaft and drive shaft to rotational movement of a vertical agitation shaft. The crank shaft is removable from the horizontal drive shaft and the agitation assembly via a quick connect/disconnect mechanism.

The first end of the agitation shaft engages the gear assembly and extends vertically toward the bottom of the receptacle. On the second end of the agitation shaft one or more paddles connect with the agitation shaft and are seated at or just above the bottom of the receptacle. The gear assembly translates the rotational movement from the horizontal crank shaft and drive shaft to rotational movement of an agitation shaft. The foregoing further translates into rotation of the paddles about the axis of the agitation shaft.

The gear assembly, crank shaft and drive shaft are further supported by a stabilizing assembly. The stabilizing assembly, gear assembly, crank shaft and drive shaft with paddles are quickly attachable/removable from the receptacle for cleaning and for easily converting to an alternative use of the receptacle, lid and handle with or without the stabilizing assembly, gear assembly, crank handle and drive shaft.

The receptacle and agitation assembly may be formed of rigid or semi-rigid material such as metal, and more specifically, stainless steel or aluminum. The handle may be formed of like components, or alternatively, heat resistant materials as is common with cooking equipment. It is contemplated that a motor to drive the drive shaft may also be incorporated.

According to one or more examples of embodiments, a food preparation device is provided. The food preparation device has a receptacle with a substantially planar bottom, a substantially vertical, annular sidewall having one edge in continuous contact with the bottom, an annular rim in continuous contact with the sidewall, vertically opposed to the bottom, and a handle projecting from the annular sidewall. The food preparation device also has an agitation assembly including a crank shaft extending substantially parallel to a plane defined by the substantially planar bottom of the receptacle and extending through the handle into the receptacle, wherein the crank shaft has a first axis of rotation. A rotating handle is attached to the crank shaft, wherein the rotating handle is configured to be rotated by a user to rotate the crank shaft about the first axis of rotation. A drive shaft having the same first axis of rotation and in line with the crank shaft is also provided, wherein the drive shaft removably connects to the crank shaft on one end such that rotation from the crank shaft is transferred to the drive shaft. An agitation shaft is provided substantially perpendicular to the plane defined by the bottom of the receptacle, the agitation shaft having a second axis of rotation. A gear assembly is mechanically linked to the drive shaft and to the agitation shaft to transfer rotation about the first axis of rotation to the second axis of rotation. At least one paddle is provided proximate the bottom of the receptacle and coupled to the agitation shaft. A stabilizing assembly, formed by a support frame circumnavigating the crank shaft, drive shaft, and gear assembly, removably engages the annular sidewall.

Referring to the Figures, a food preparation device is provided. The device incorporating various features of the present inventions is illustrated generally in the Figures. The device 1 is designed for safer popping popcorn or other food preparation by stabilizing the agitation process for moving popcorn kernels or other food during the heating process and reducing the likelihood of spilling or splattering of hot contents, as well as providing a means to easily disassemble and clean the device. While disclosed for use with popcorn for purposes of example, the device may also be used for other purposes, such as for instance roasting coffee beans, cooking food which requires stirring, and the like.

Figure 4:
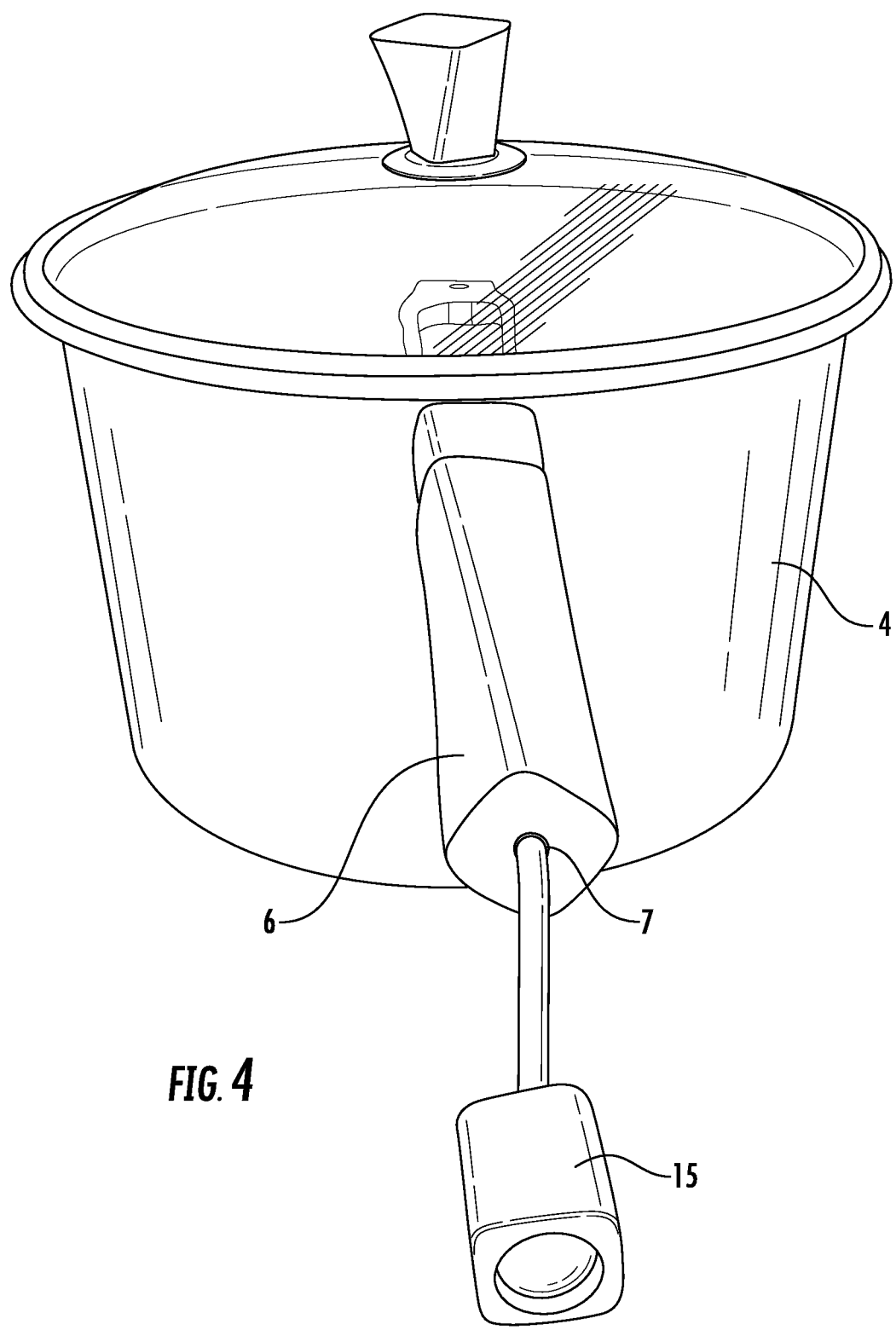
FIG. 4 is a side elevation perspective view of the device showing the handle, handle aperture, crank shaft, and crank knob.
Figure 11:
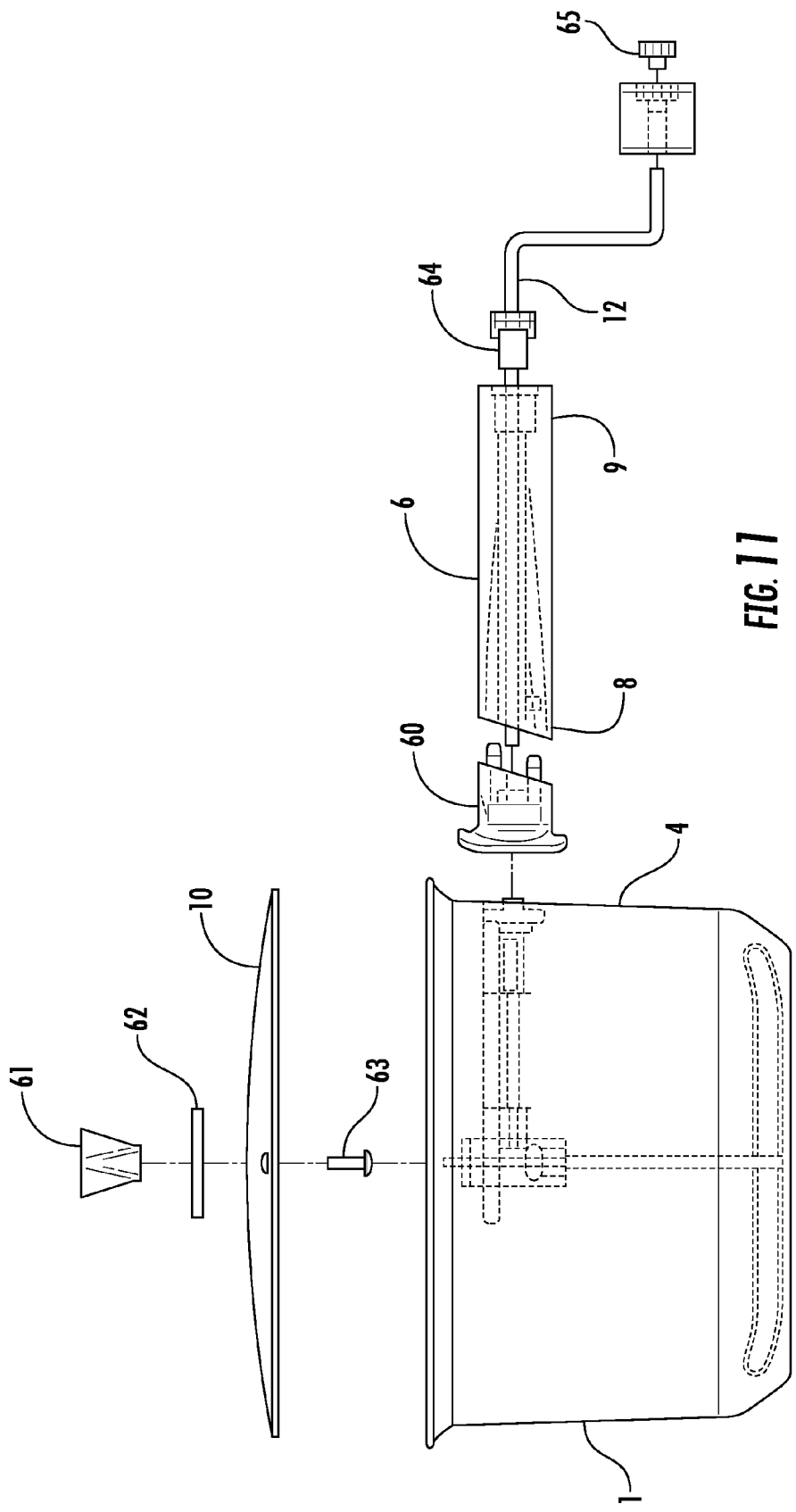
FIG. 11 is a side elevation partial exploded view of the device.
Figure 12:
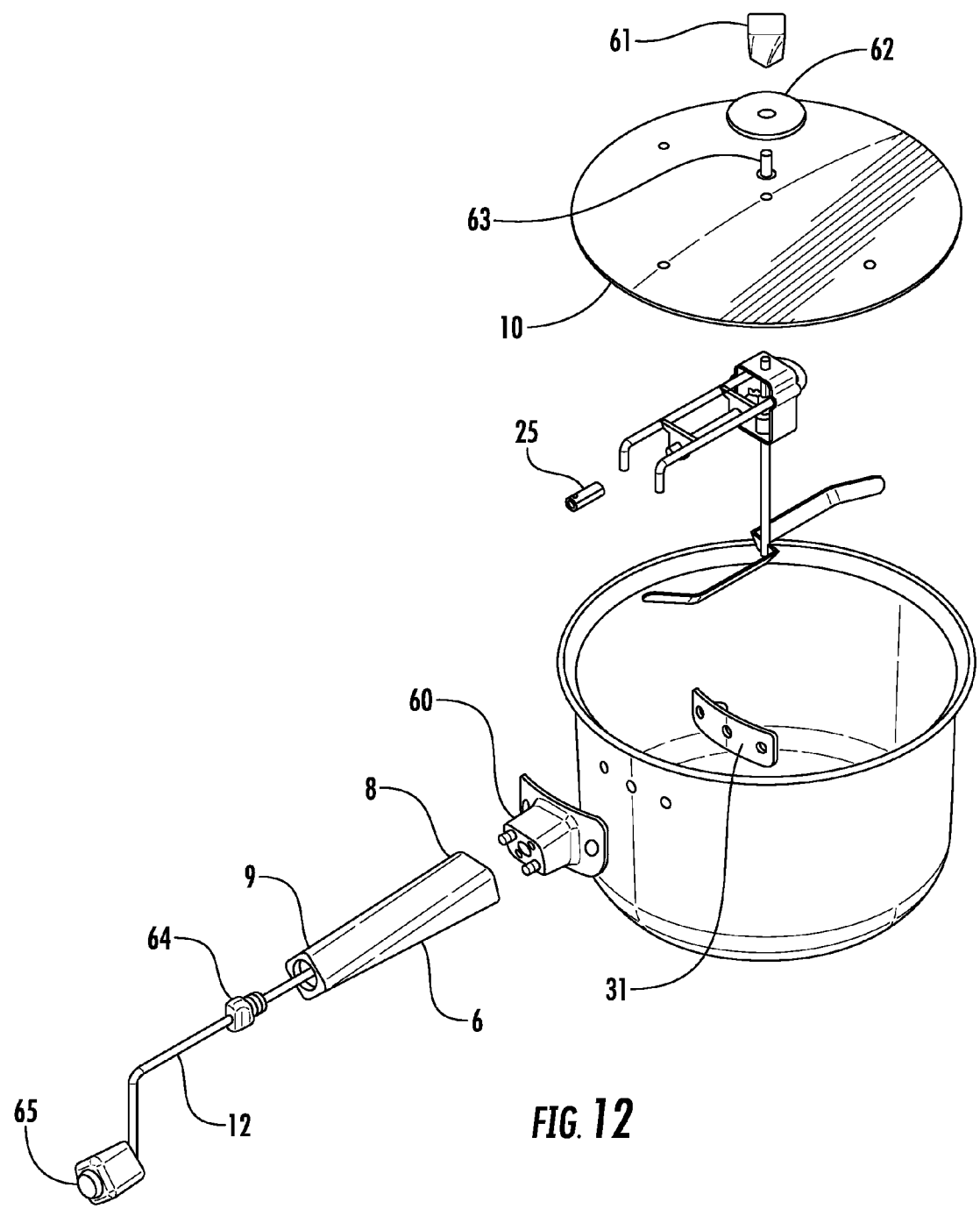
FIG. 12 shows a perspective exploded view of the device.

The food preparation device as shown in FIG. 1 includes a receptacle 2 into which food (e.g., such as unpopped kernels) are placed for heating. The receptacle 2 generally comprises a substantially planar and circular bottom 3 which attaches to an annular sidewall 4. The upper edge of the annular sidewall 4 terminates in an annular rim 5. While a specific example is provided, it is understood that a variety of shapes and dimensions of receptacle 2 and its various components may be used without departing from the overall scope of the present invention. For example, the receptacle 2 may be oblong or square or polygonal, and may have a bottom which is bowed, has ridges, or is otherwise not planar. Example receptacles (e.g., pots) are well-known in the art of cooking, and the features shown in the accompanying Figures could be altered to conform to a user's particular needs. In one or more examples of embodiments, the receptacle 2 is fabricated from a rigid material with a high heat conductivity. One such example material is a metal or metal alloy, although alternatives having similar properties are acceptable. A handle 6 is attached to the annular sidewall 4 and extends outwardly or radially therefrom. The handle 6 of one or more examples of embodiments is preferably fabricated from a heat resistant material, examples of which include, but are not limited to wood, hard plastic, or insulated or non-conductive metal. The handle 6 is fastened to the sidewall 4 with adhesive, welding, or mechanical fastener, such as a screw-type fastener or the like as commonly known in the art. The handle 6 defines or includes an aperture or throughbore 7, or opening on the first and second ends 8 and 9 as seen in FIG. 4 (see also FIGS. 11-12). In one embodiment, shown in FIGS. 11 and 12, the handle 6 is fastened to a coupler 60 that is, in turn, secured to the sidewall 4. This allows the handle 6 to be removed and/or replaced if necessary. The aperture 7 or opening or throughbore in the handle continues through the first end 8 of the handle through coupler 60 and through the sidewall 4. The coupler 60 is fastened to the sidewall 4 with adhesive, welding, or mechanical fastener, such as a screw-type fastener or the like as commonly known in the art.

The lid 10, in one or more examples of embodiments, has an outer edge that is substantially the same size as, or fits snugly with, the annular rim 5 of the receptacle 2 as shown in FIG. 1. Water vapor, in the form of steam, is produced by the popping of popcorn. As a result, it is not typically desired to have an airtight or watertight seal between the lid 10 and the rim 5. This allows the water vapor to escape along the rim. In addition, water vapor or steam vents 11 may be provided which direct steam through the lid 10. In another embodiment, a seal may be provided at the interface of the lid and receptacle; in which case the lid 10 and rim 5 may be operably configured to interact to form a seal. Additional components, such as a silicone bead or rubber ring may be added to the lid 10 and/or rim 5 to form a seal. In one or more examples of embodiments, to increase visibility without allowing splattering of hot contents, a transparent lid 10 may be used, such as one made substantially of glass, which may be tempered, although variations thereon and alternative materials having properties of the type described herein would not depart from the overall scope of the present inventions. In one embodiment, shown in FIGS. 11 and 12, the lid also may contain a lid handle 61, which may have a washer 62 between the lid 10 and the lid handle 61. The washer 62 may be preferably made of metal, rubber, or heat-resistant plastic. In one or more examples of embodiments, the lid handle 61 may be fabricated from a heat resistant material such as wood, hard plastic, or insulated or non-conductive metal and is fastened to the lid 4 with adhesive, welding, or mechanical fastener, such as a screw-type fastener 63 or the like, as commonly known in the art.

Figure 3:
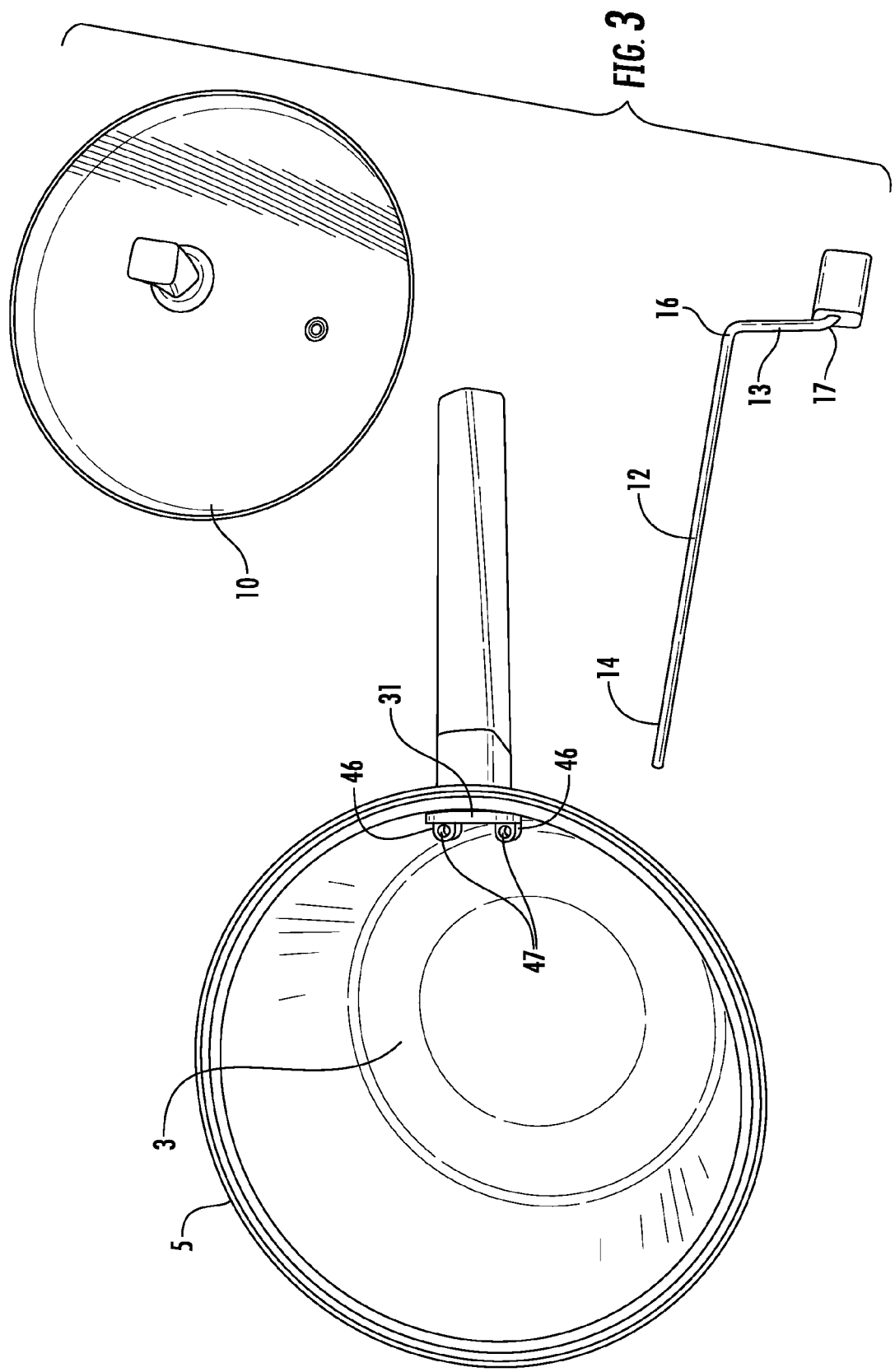
FIG. 3 is a top elevation partial perspective view of the receptacle and handle, crank handle, and crank shaft.

The crank assembly as shown in FIG. 3 comprises a crank shaft 12 with a first end 13 and a second end 14, and a crank handle 15 attached to the first end. The crank shaft 12 has a length sufficient to extend through the throughbore of the handle 6 and, in one embodiment, into the interior of the receptacle 2. The crank handle may be pivotably attached to the first end 13 of the crank shaft 12. The second end of the crank shaft 12 may have a mechanism for attachment to a connector or drive shaft (as further described herein below). In one or more examples of embodiments, the crank shaft 12 defines a first bend 16 and a second bend 17 such that the first end 13 is displaced from the longitudinal axis of the device handle 6 and extends radially from the receptacle 2. Alternatively, the crank shaft 12 may not include one or both bends 16, 17 and/or the crank handle 15. In a further alternative example, the crank shaft 12 may not have any bends, but terminates with a crank handle. The crank handle may be or have one or more protuberances that project radially at an angle from the crank handle surface (such as, but not limited to, between 45 degrees and 90 degrees from the axis of the crank shaft 12) such that the operator may impart force on the protuberances to create rotational force around the crank shaft 12. Alternatively, the crank handle 15 may be or have a uniform surface (such as but not limited to a roughly circular disk handle or knob) such that the operator may impart force by twisting the circular disk or knob in a clockwise or counterclockwise rotation in relation to the face of the disk or knob to create rotational force around the crank shaft 12. In one embodiment, shown in FIGS. 11 and 12, a plug 64 is located on the crank shaft 12 to fit into the second end 9 of the handle 6 to prevent the crank shaft from slipping or moving within the aperture 7 of the handle 6. In addition, the crank handle 15 may be held on to a crank shaft 12 using a stopper 65 that prevents the crank handle 15 from sliding off the crank shaft 12 yet still be able to rotate freely around the crank shaft 12 longitudinal axis. Alternative means of removably retaining the crank shaft 12 on the handle are also acceptable.

An agitation assembly 18 is provided (shown in FIGS. 5 and 6) for agitating food in the receptacle 2. The agitation assembly 18 is removable from the receptacle 2. The agitation assembly 18 includes a drive shaft 19, agitation shaft 20, paddles 21, and gear assembly 22. The drive shaft 19 has a first end 23 and a second end 24. In one example of embodiments, the first end 23 of drive shaft 19 removably attaches to a connector 25 attached to the second end 14 of the crank shaft 12, and the second end 24 of the drive shaft 18 engages with a gear assembly 22. In at least one embodiment shown in FIG. 12, the connector 25 removably attaches to both the crank shaft 12 and the drive shaft 19.

Figure 7:
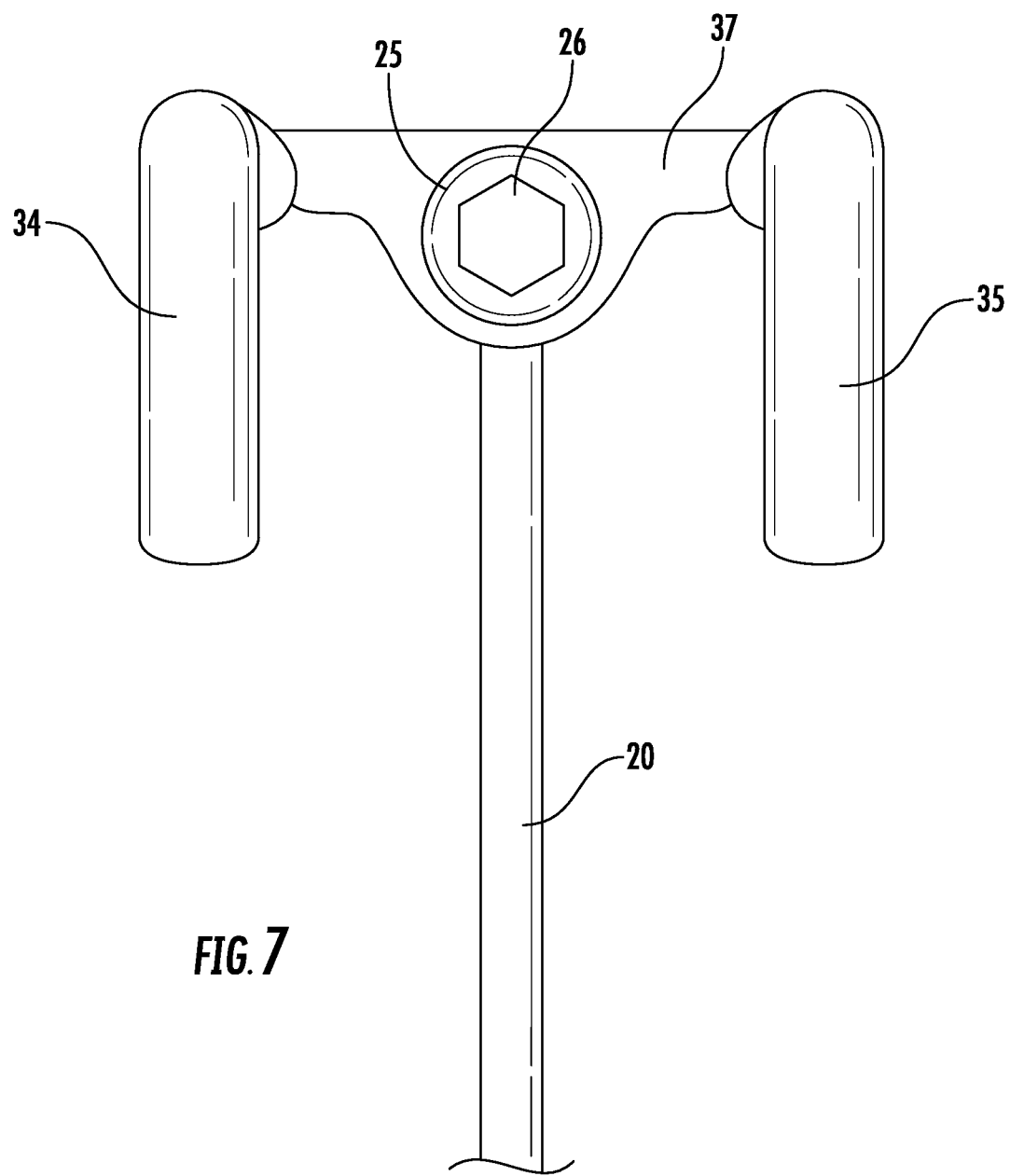
FIG. 7 is a cut-away back plan view of the stabilizing assembly, connector, supports, and connector aperture.

In one or more alternative examples of embodiments, the connector 25 is affixed to the first end 23 of the drive shaft 18 and removably engaged with the second end 14 of the crank shaft 12. The connector 25 allows the second end 14 of the crank shaft to removably engage with the first end of the drive shaft. Various mechanisms may be used for quick connect/quick disconnect. The connector 25 may be a quick connect/quick disconnect coupling engaged with the first end of the drive shaft 18 and the second end 14 of the crank shaft 12. In one example embodiment illustrated in the Figures, the quick connect/quick disconnect coupling if formed by the crank shaft's second end 14 has a polygonal diameter, as shown in FIG. 3, which coincides with an aperture 26 of same shape in the first end 27 of the connector 24, which is shown in FIG. 7. Alternatively, the connector 24 with the aperture 26 is attached to the crank shaft 12 and the first end of the drive shaft 18 then is shaped as a polygonal diameter to fit into the connector 24. In other words, a polygonal key male component on one shaft and polygonal receiving female component on the other shaft may be used. Alternatively, a quick disconnect coupler plug and body, a poppet coupling, quick clip, or other similar quick connect/disconnect couplings may be used. According to the foregoing, the drive shaft is separable from the crank shaft to permit quick assembly and disassembly.

Figure 5:
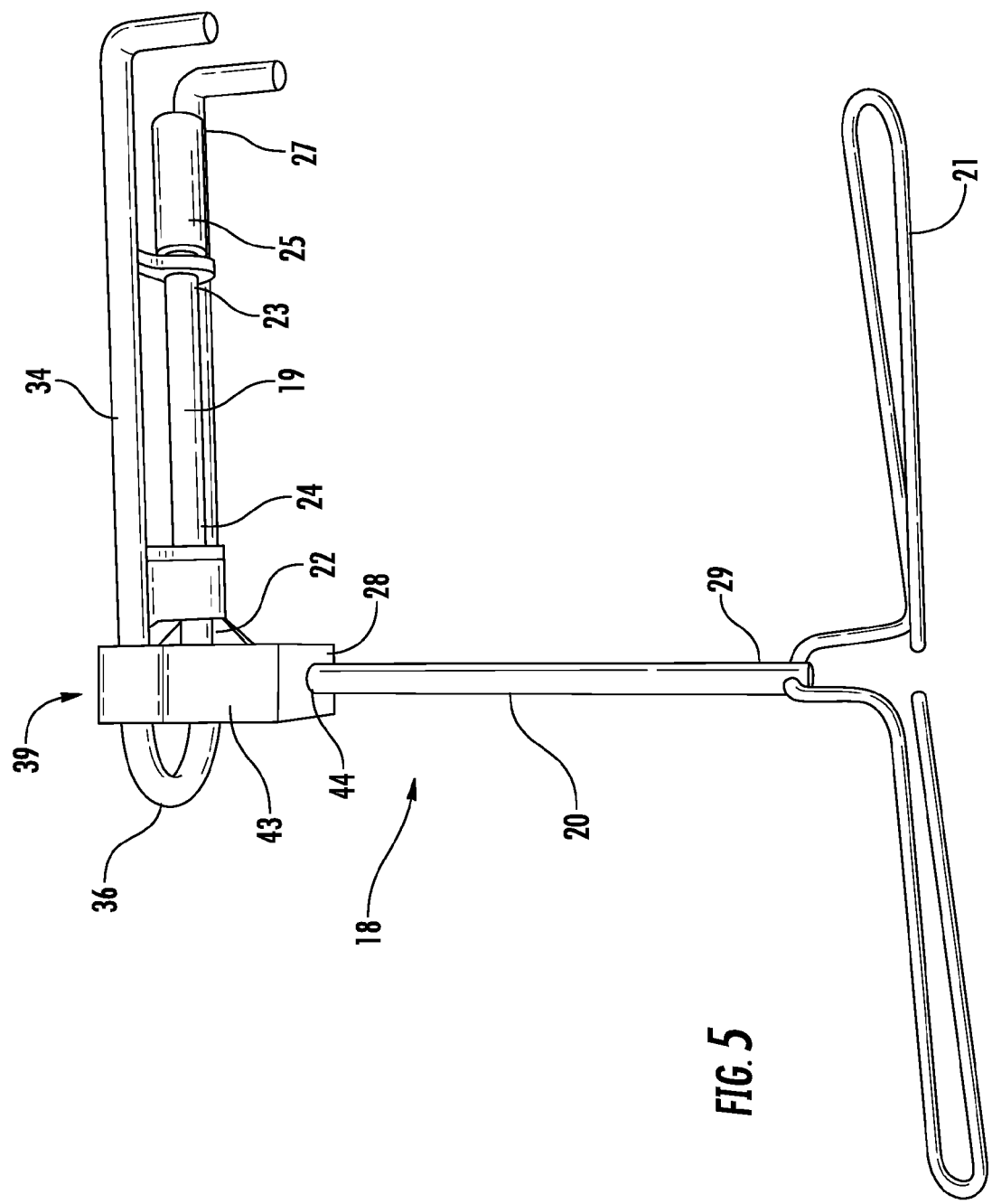
FIG. 5 is a side elevation perspective view agitation assembly showing the stabilizing assembly, agitation shaft, and paddles.

A gear assembly 22 is connected to the drive shaft's second end 24 as seen in FIG. 5. In one or more examples of embodiments, the drive shaft 19 and gear assembly 22 are fabricated from a rigid or semi-rigid material such as metal or plastic. The gear assembly 22 could be bevel pinions, toothed gears, cogwheels or other such gears known in the art to allow the transfer of torque from the drive shaft 19 to an agitation shaft 20. Likewise, while a gear assembly is shown, alternative means to impart rotational motion onto the agitation shaft and/or paddles may be used.

Figure 6:
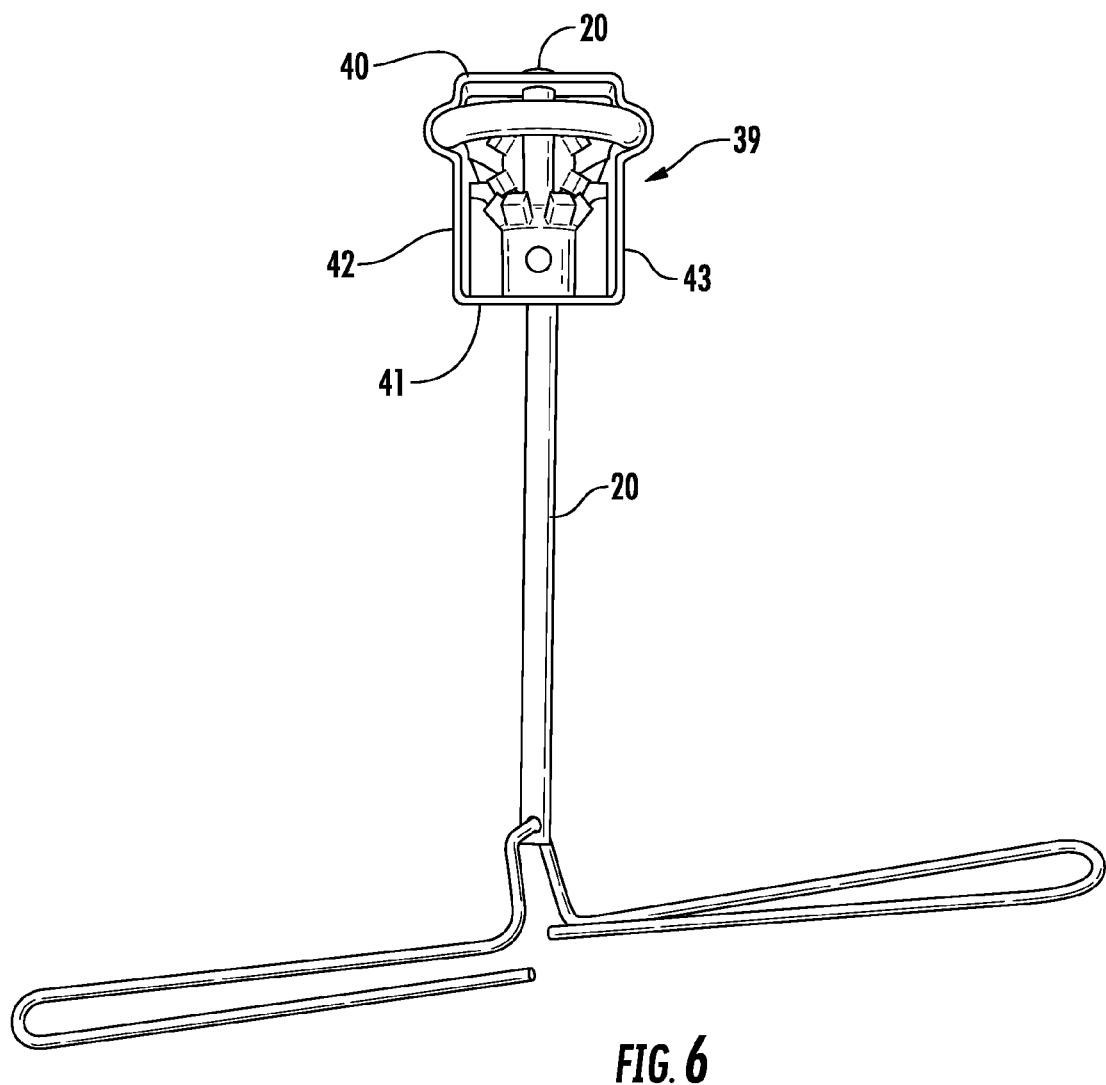
FIG. 6 is an alternative side elevation perspective view agitation assembly showing the stabilizing assembly, gear assembly, agitation shaft, and paddles.

An agitation shaft 20 is provided to cooperate with the gear assembly 22 to allow the gear assembly to transfer the torque generated from the drive shaft 19 or rotation of the drive shaft to the agitation shaft 20. The agitation shaft 20 has a first end 28 and second end 29. The first end 28 engages the gear assembly 22. The agitation shaft 20 is proximate to the center of the receptacle 2 and extends proximate the bottom 3 of the receptacle 2. In the preferred embodiment, the agitation shaft 20 and gear assembly 22 are fabricated from a rigid or semi-rigid material such as metal or plastic. At least one paddle 21 is attached at or near the second end 29 of the agitation shaft 20 and configured to rotate therewith. While a plurality of paddles 21, and in particular two paddles, are shown in FIGS. 5 and 6 in linear opposition of the axis of the drive shaft 19, a single paddle or more than two paddles may also be used. Additionally and alternatively, paddles may not be in linear opposition of the axis of the drive shaft. While a specific example is illustrated, the paddle(s) may be of any now known or future developed device for moving product similar to a paddle, such as but not limited to a wire rod, a looped wire, a formed shape, and the like.

A stabilizing assembly 30 is provided to stabilize the agitation assembly 18. The stabilizing assembly 30 engages with the annular sidewall 4. In one embodiment shown in FIG. 2, the stabilizing assembly 30 circumnavigates the crank shaft 12 and/or drive shaft 19 with first and second legs 34 and 35. The first and second legs 34 and 35 coordinate to define a bend or other circumnavigation 36 proximate the gear assembly 22, and may be formed of a single element. Alternatively, the legs 34, 35 may be formed of two or more connected elements. A support 39 may be located proximal to the bend 36 that is comprised of a top 40, bottom 41, left 42 and right 43. The left support side 42 attaches to the first leg 32 and the right support side 43 attaches to the second leg 35 on either side of the gear assembly 22. The bottom 41 contains an aperture 44 through which the agitation shaft 20 is journaled. A second aperture 45 in the top support may allow the further journaling of the agitation shaft 20. In one embodiment, one or more supports 37 span between the legs 34 and 35. Each support has an aperture 38 through which the crank shaft 12 or drive shaft 19 is journaled through said aperture 38 such that the crank shaft 12 or drive shaft 19 is restrained from movement along the longitudinal axis of the aperture 38 while allowing vertical rotation of the crank shaft 12 or drive shaft 19. In one embodiment the stabilizing assembly may be open to the receptacle such that the operator may see the moving parts. In another embodiment part or all of the stabilizing assembly may be enclosed.

In one embodiment, the first and second legs 34 and 35 engage the annular sidewall 4 by coming into direct contact with the sidewall. The end of the legs may be coated in a plastic or rubber to prevent scratching of the sidewall 4. Additionally or alternatively, the end of the legs 34 and 35 may be of a greater circumference than the legs themselves to allow more surface area to be in contact between the legs 34 and 35 and the sidewall 4.

Figure 2:
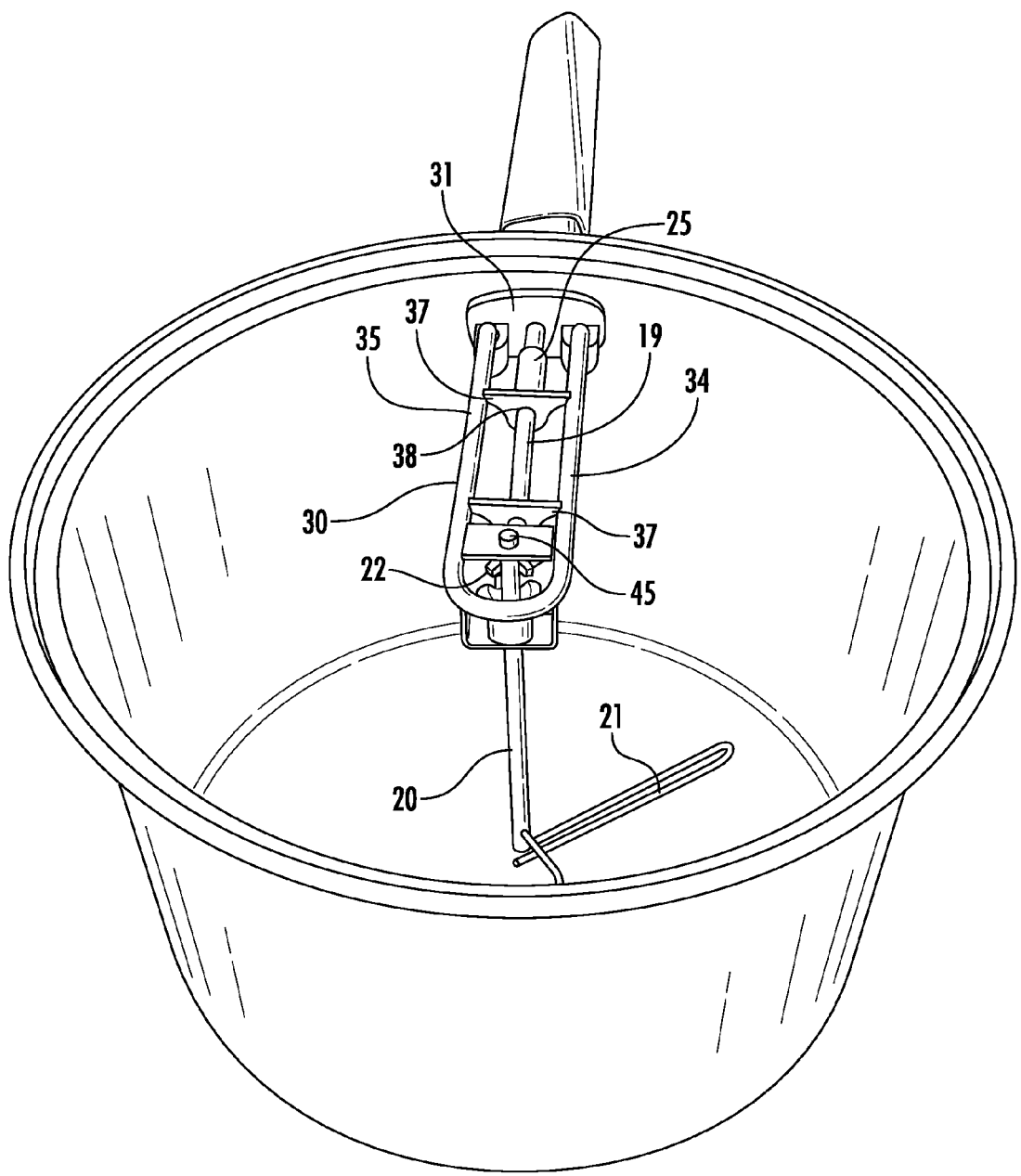
FIG. 2 is a top elevation perspective view of the device receptacle, handle, drive shaft, stabilizing assembly, agitation shaft, and paddles.

In another embodiment, as shown in FIGS. 2 and 3, a mount 31 attaches to the annular sidewall 4. The mount 31 includes an aperture 32 that coincides with location and shape of both the aperture 7 in the handle 6 and an aperture in the sidewall 4 such that the crank shaft 12 journals through said mount aperture 32. The mount 31 is attached to the sidewall 4 through adhesive, welding, mechanical attachments such as a screw or any other means well-known in the art. The first and second legs 34 and 35 each end in a bend (e.g., a ninety-degree bend) to be inserted into the mount aperture(s). In one example, the bent ends run approximately parallel with the agitation shaft 20 as shown in FIG. 5. The stabilizing assembly 30 engages the sidewall 4, in one embodiment, via two protrusions 46 from either a mount 31 or sidewall 4 with one on either side of the mount aperture 32 and apertures 47 in each of the protrusions 46 as shown in FIG. 3. The stabilizing assembly's first and second ends 34 and 35 then journal through the apertures 47 in the protrusion 46 from the mount 31 or the sidewall 4 as shown in FIG. 2.

Figure 8:
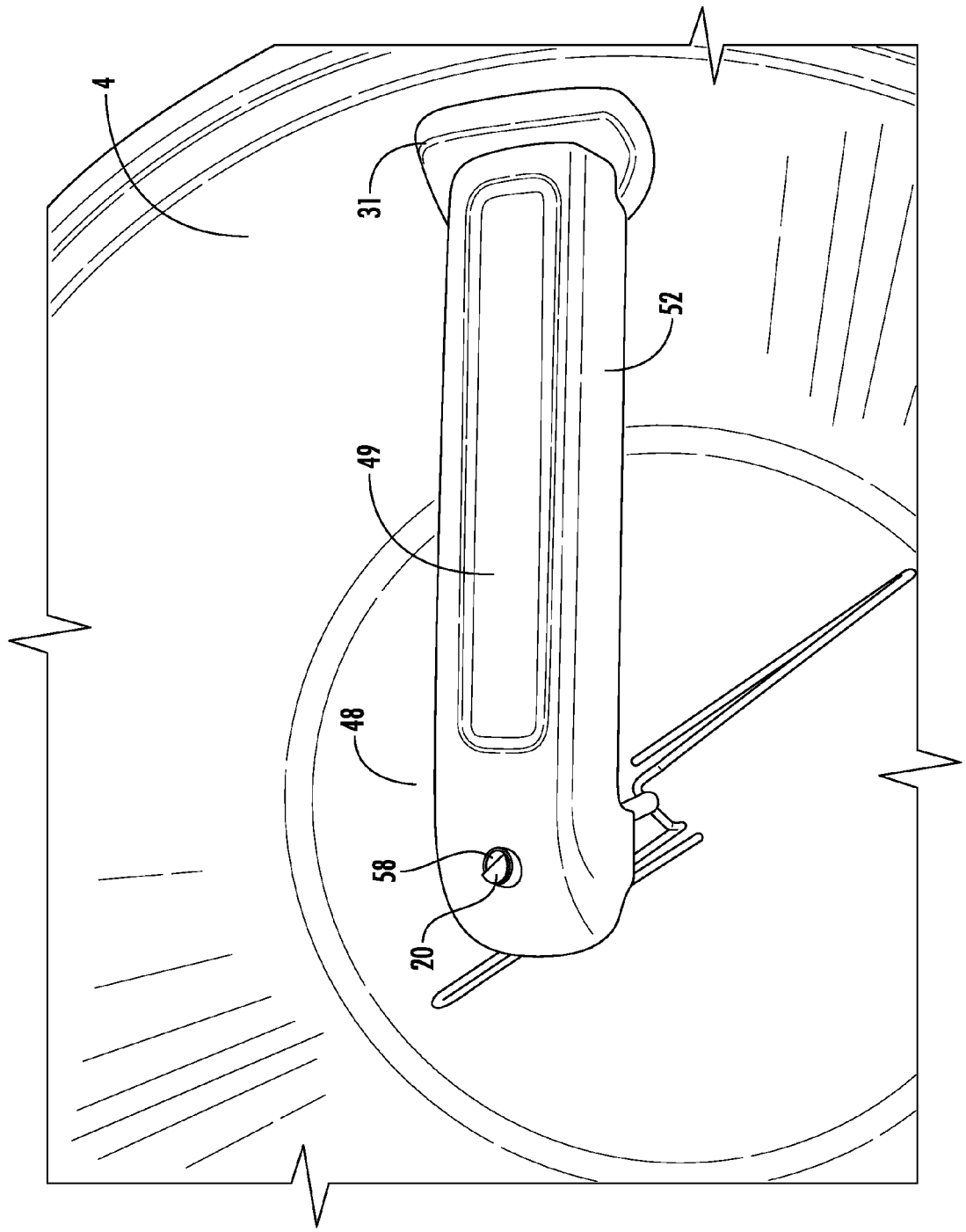
FIG. 8 is a cut away a top elevation perspective view of another embodiment of the stabilizing assembly, showing a casing.
Figure 9:
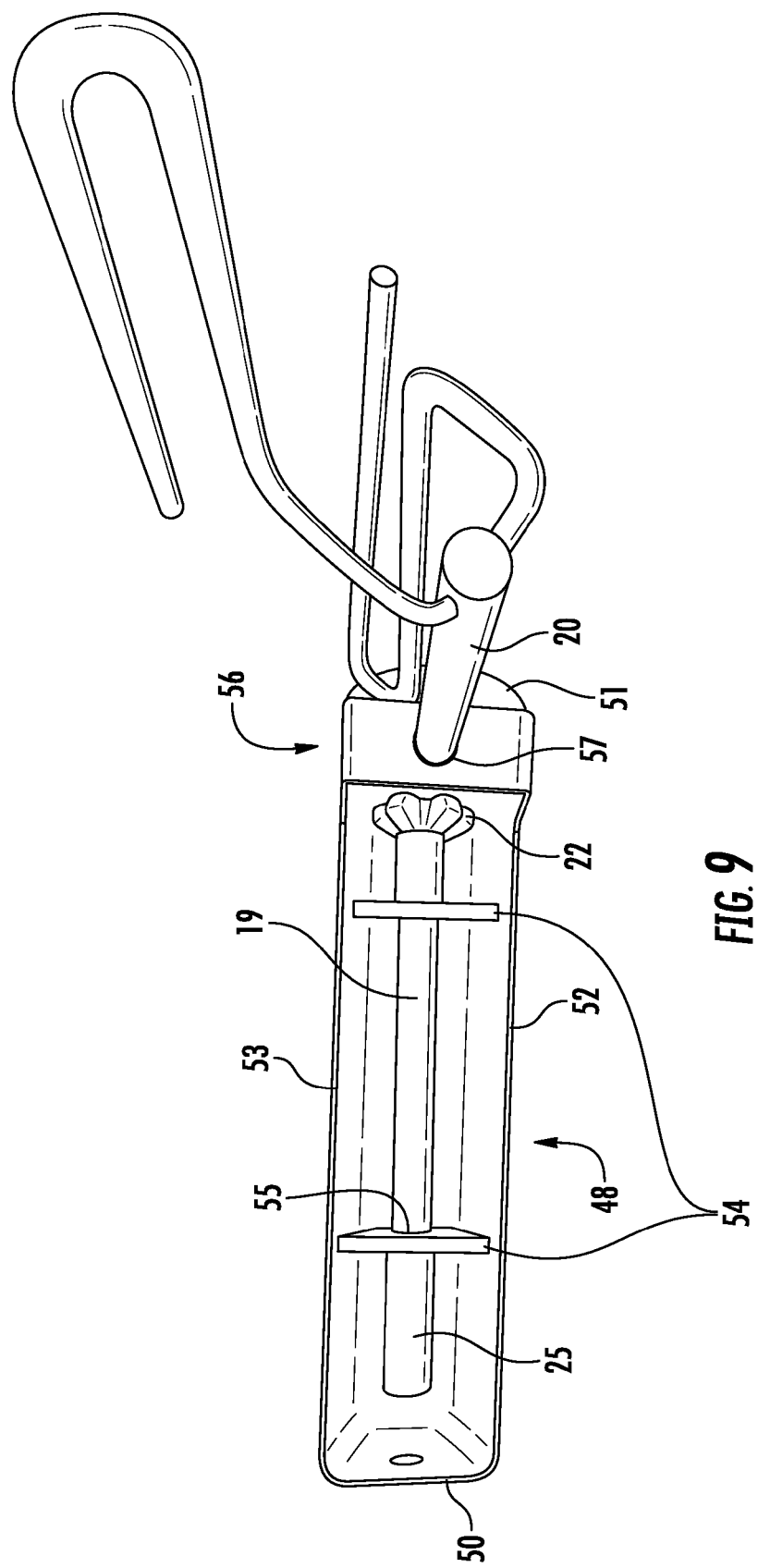
FIG. 9 is a bottom elevation perspective view of another embodiment of the agitation assembly showing stabilizing assembly with casing, supports, gear assembly, drive shaft, connector, and agitation shaft.

In another embodiment, as shown in FIGS. 8 and 9, the stabilizing assembly 30 is a casing 48 that surrounds the top 49, front 50, back 51, right 52 or left side 53 of the drive shaft 19 or crank shaft 12. As shown in FIG. 9, a plurality of supports 54 attach to the right side 52 and left side 53 of the casing 48. Each support 54 has an aperture 55 through which the crank shaft 12 or drive shaft 19 is journaled through said aperture 55 such that the crank shaft 12 or drive shaft 19 is restrained from movement along the longitudinal axis of the aperture 55 while allowing vertical rotation of the crank shaft 12 or drive shaft 19. A further support 56 is connected to the right side 52 and left side 53 of the casing 48 and parallel to the top of the casing 49. The support 56 contains an aperture 57 through which the agitation shaft 20 is journaled. The top 49 of the casing 51 may also contain an aperture 58 to allow the agitation shaft 20 to journal through said aperture.

Figure 10:
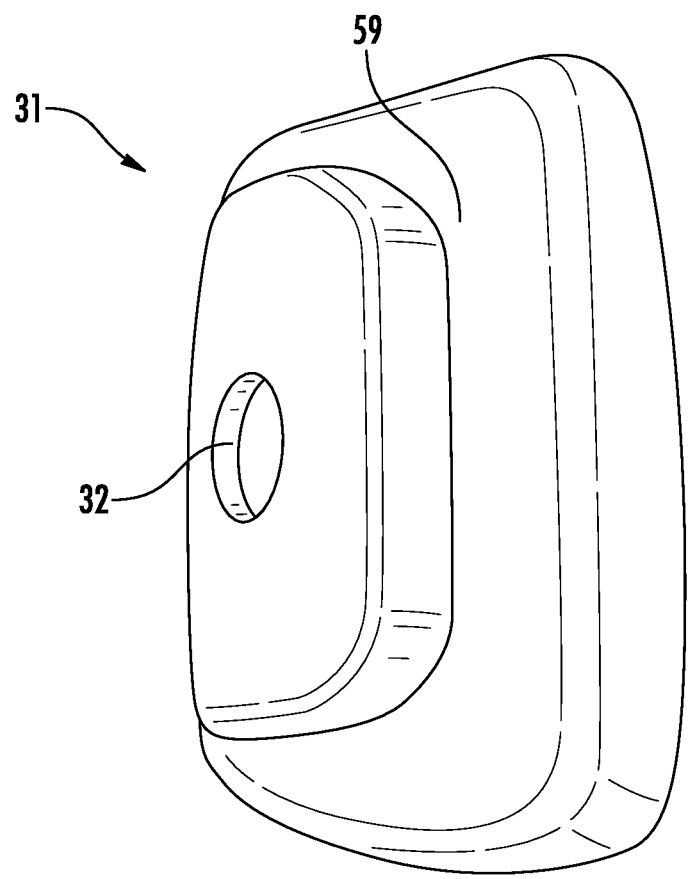
FIG. 10 is a side elevation perspective view of the stabilizing assembly mount for attachment to the sidewall of the receptacle.

In one embodiment, the casing 48 engages the annular sidewall 4 by coming into direct contact with the sidewall 4. The edge of the casing may be coated in a plastic or rubber to prevent scratching of the sidewall 4. In another embodiment, as shown in FIG. 10, the mount 31 contains a slit 59 that is parallel to both the sidewall 4 the bottom 3. The slit 59 receives the back side of the casing 51.

Figure 13:
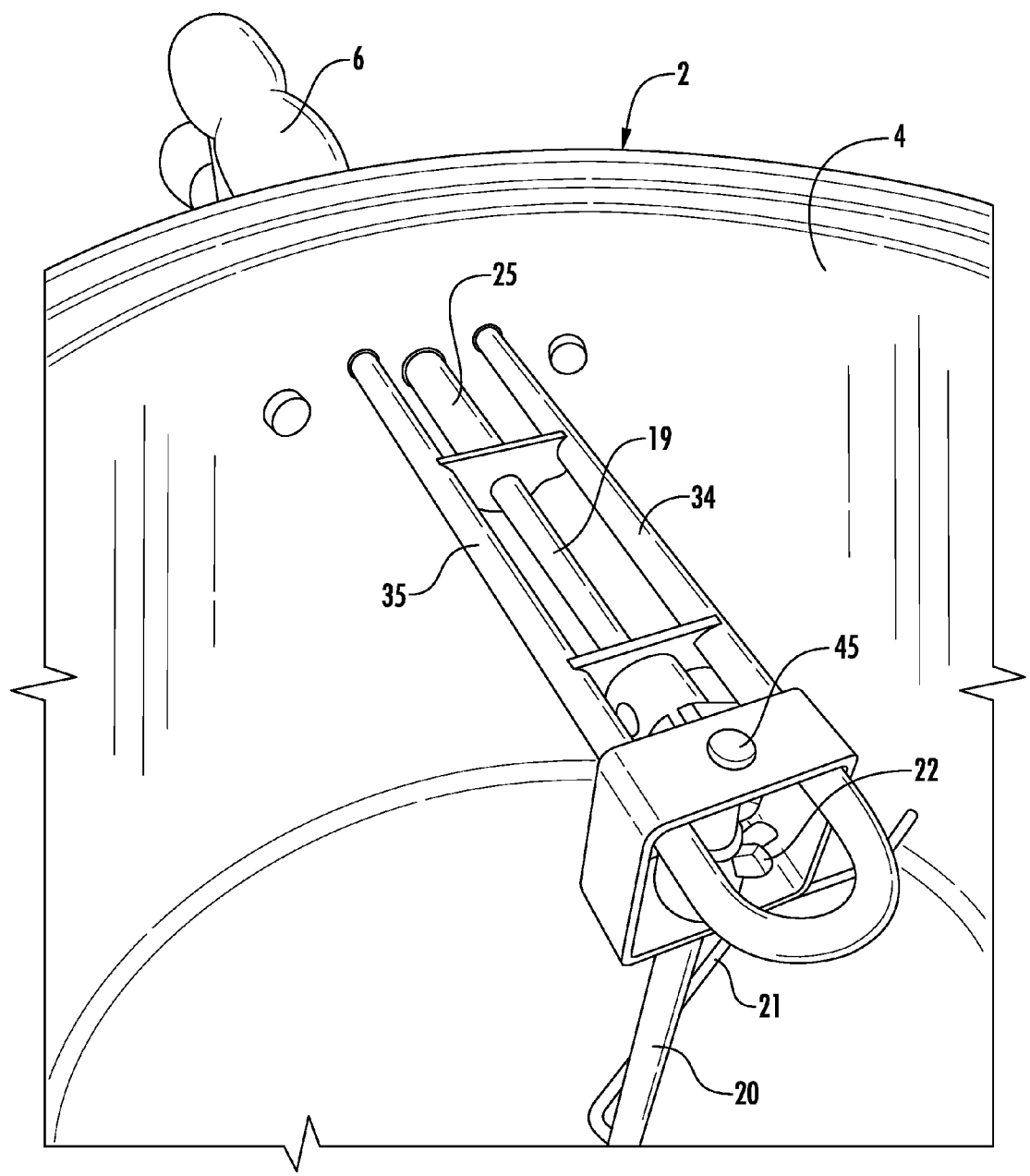
FIG. 13 is a cut-away perspective view showing one or more alternative examples of embodiments, and showing an agitation assembly which extends through a sidewall of the receptacle.
Figure 14:
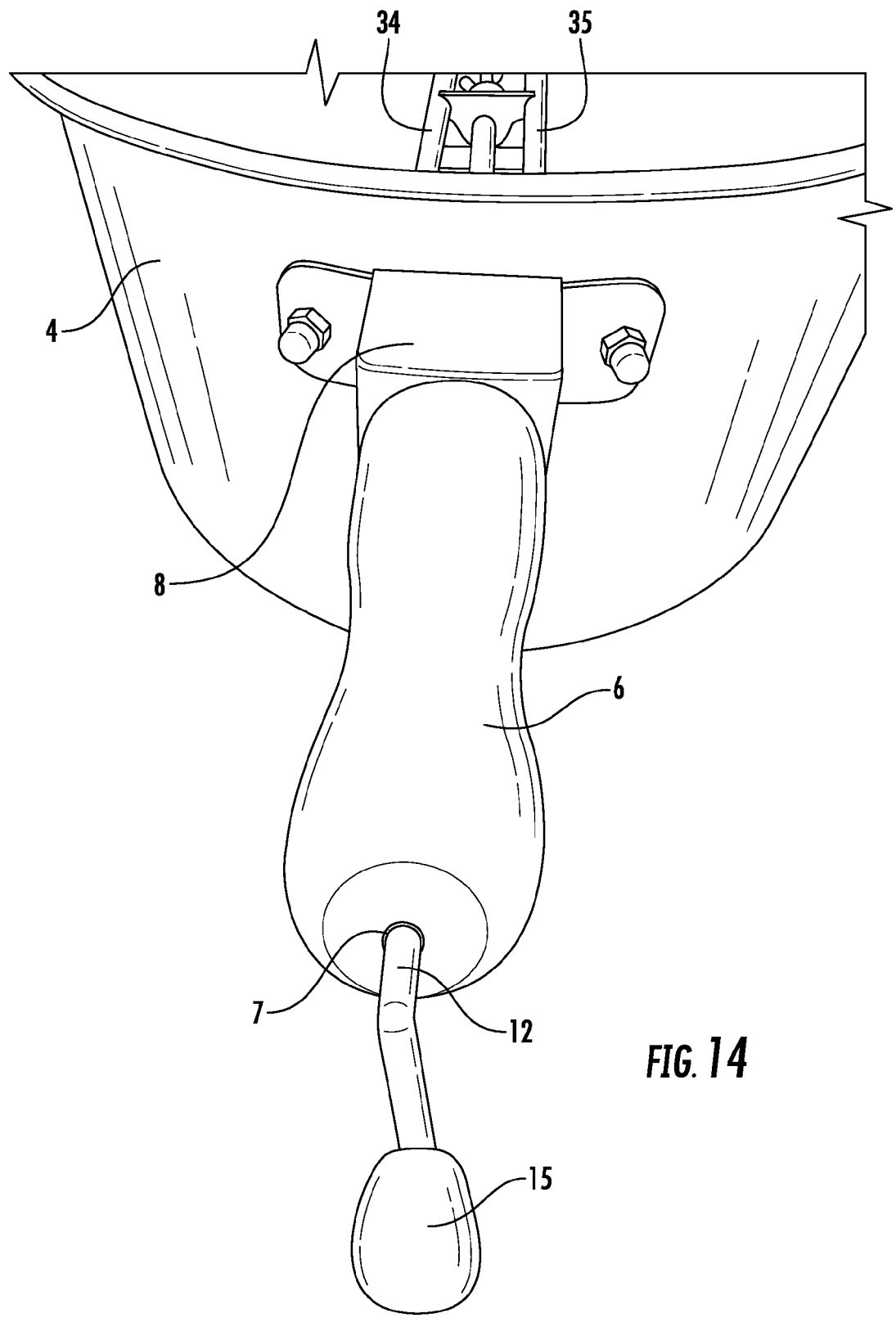
FIG. 14 is an additional cut-away perspective view showing the alternative example of embodiments shown in FIG. 13, showing the handle and crank shaft/handle on the receptacle.
Figure 15:
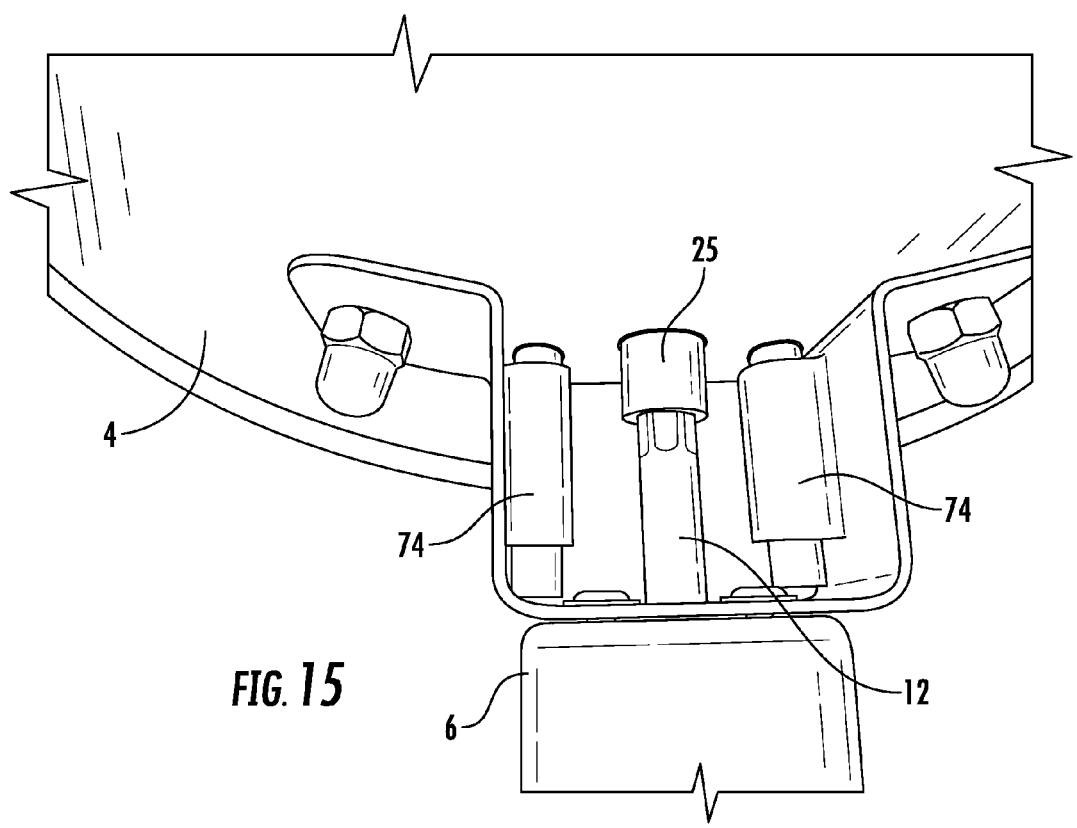
FIG. 15 is an additional cut-away perspective view, from the underside of FIG. 14, showing the engagement of the crank shaft, drive shaft, and stability assembly in the handle.

One or more alternative examples of embodiments are shown in FIGS. 13-15. In particular, as shown in these Figures, the drive shaft 19, and legs 34, 35 of the stability assembly 30 extend through apertures in the sidewall 4 of the receptacle 2. Alternatively, the connector 25 may extend through an aperture in the sidewall 4. In this regard, the drive shaft 19, legs 34, 35, and/or connector 25 may be attached to the handle or a portion thereof (e.g., such as coupler 60) external to the container receptacle interior (in which food is cooked). In one example, as can be seen in reference to FIGS. 14-15, connector 25 extends through an aperture in the sidewall 4 and removably engages the crank shaft 12 on the exterior side of the container, but within the handle. In the illustrated example, the crank shaft and connector are engaged by a polygonal fitment or hex-key type arrangement. In an alternative example, the draft shaft 19 extends through the sidewall 4 and removably engages the crank shaft 12 in the handle. In this embodiment, the crank shaft 12 extends through the handle aperture 7, but does not extend into the interior of the receptacle 2. The crank shaft 12 may be retained or engaged by the same means with the drive shaft 19 (and connector 25) as previously described herein. Likewise, the first and second legs 34, 35 are removably engaged and retained, such as by quick clips 74 or alternative means of attaching or engaging or otherwise retaining the legs, in the handle—which may be exterior to the receptacle interior. In the illustrated embodiment, the quick clips 74 form a part of or are attached to the handle, although separate components which are attached to the legs may be used in place of the illustrated example.

In a further alternative embodiment, while a crank shaft 12 and handle are disclosed, a plug or other mechanism to seal the aperture 7 in the handle 6 may be provided. That is an insert may be used in place of the crank shaft 12 to seal the container or receptacle at the aperture 7 or throughbore. In one example of embodiments, the plug or insert may extend through the entire throughbore or aperture, or may extend a portion thereof, and may also be locked or otherwise secured in position. Alternatively, the plug may removably cover and seal, for example, just the opening to the receptacle or just the opening on the handle, or both. Any suitable material may be used for closing and sealing the aperture and throughbore.

From the foregoing description, it will be recognized by those skilled in the art that a food preparation device offering advantages over the prior art has been provided. Specifically, the device is designed for safer agitation of heated foods, such as but not limited to popcorn, by stabilizing the mechanisms used to agitate the food during the heating process, increasing visibility while the food is being agitated and heated, and reducing the likelihood of spilling and splattering of hot contents. Additionally, food preparation device is designed for quick and easy conversion between the use of the device as a food agitation device and as a standard cooking pot, as well as for ease of cleaning, and effective cleaning, by hand or dishwasher. For example, the agitation assembly may be quickly disconnected and removed and the components placed in a dishwasher or hand washed, and subsequently, quickly reassembled for use.

The device may enhance safety by allowing operation away from the heat source, by adding stability to the agitation mechanism, by adding better visibility of the cooking process, and/or by reducing the risk of splattering or spilling of hot contents. Additionally, a device that is easily converted to allow other uses without the agitation mechanism is provided.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A food preparation device comprising:
   a receptacle having a substantially planar bottom, a substantially vertical, annular sidewall having one edge in continuous contact with the bottom, an annular rim in continuous contact with the sidewall, vertically opposed to the bottom, and a handle projecting from the annular sidewall;
   a removable agitation assembly comprising:
      a crank shaft extending substantially parallel to a plane defined by the substantially planar bottom of the receptacle and extending through the handle, through the annular sidewall, and into an interior of the receptacle, wherein the crank shaft has a first axis of rotation;
      a rotating handle attached to the crank shaft, wherein the rotating handle is configured to be rotated by a user to rotate the crank shaft about the first axis of rotation;
      a stabilizing assembly provided within the interior of the receptacle and formed by a support frame, wherein the stabilizing assembly removably engages the annular sidewall;
      a drive shaft having the same first axis of rotation and in line with the crank shaft, wherein the drive shaft is carried by the stabilizing assembly;
      a quick connect coupling joining the drive shaft and the crank shaft and configured to removably connect the drive shaft and crank shaft and configured to transfer rotation from the crank shaft to the drive shaft;
      an agitation shaft substantially perpendicular to the plane defined by the bottom of the receptacle, the agitation shaft having a second axis of rotation;
      a gear assembly mechanically linked to the drive shaft and to the agitation shaft to transfer rotation about the first axis of rotation to the second axis of rotation;
      at least one paddle proximate the bottom of the receptacle and coupled to the agitation shaft, such that rotation of the crank shaft imparts movement to the at least one paddle.

2. The food preparation device of claim 1, further comprising a lid in removable contact with the annular rim of the receptacle.

3. The food preparation device of claim 2, wherein the lid is transparent.

4. The food preparation device of claim 1, wherein the paddle is substantially parallel to the plane defined by substantially planar bottom.

5. The food preparation device of claim 1, wherein the paddle is coupled to the agitation shaft at an angle of less than 180 degrees.

6. The food preparation device of claim 1, wherein the stabilizing assembly engages the annular sidewall proximate to an entry of the crank shaft into the interior of the receptacle.

7. The food preparation device of claim 1, wherein the stabilizing assembly removably attaches to a mount secured to the annular sidewall.

8. The food preparation device of claim 1, wherein the support frame has a casing surrounding the drive shaft, and gear assembly.

9. The food preparation device of claim 1, wherein the stabilizing assembly extends through the annular sidewall and the crank shaft and drive shaft are engaged through the annular sidewall.

10. The food preparation device of claim 1, wherein the receptacle and agitation assembly are formed of rigid or semi-rigid material.

11. The food preparation device of claim 1, wherein the handle is formed of a heat resistant materials.

12. The food preparation device of claim 1, further comprising a motor for driving the drive shaft.

13. A food preparation device with a stirring mechanism comprising:
   a container having an attached handle, an aperture extending longitudinally through the handle and through a sidewall of the container, a crank shaft extending through the aperture, and having a hand crank on a first end of the crank shaft, the second end of the crank shaft removably connecting to a horizontal drive shaft, a stabilizing assembly provided within the interior of the container and formed by a support frame, wherein the horizontal drive shaft is carried by the stabilizing assembly, a quick connect coupling joining the drive shaft and the crank shaft, the horizontal drive shaft being engaged with a gear assembly that translates rotational movement from the horizontal crank shaft and drive shaft to rotational movement of a vertical agitation shaft engaged with the gear assembly, wherein the quick connect coupling engages the crank shaft such that the crank shaft is removable from the horizontal drive shaft and the agitation assembly via a quick connect/disconnect mechanism; and
   a rigid transparent lid separable from the container.

14. The food preparation device with a stirring mechanism of claim 13, wherein a first end of the agitation shaft engages the gear assembly and extends vertically toward the bottom of the receptacle, and wherein a second end of the agitation shaft has one or more paddles connected thereto and seated at or above the bottom of the receptacle.

15. The food preparation device with a stirring mechanism of claim 14, wherein the gear assembly, crank shaft, and drive shaft are supported by the stabilizing assembly.

16. The food preparation device with a stirring mechanism of claim 15, wherein the stabilizing assembly, gear assembly, crank shaft, and drive shaft with paddles are quickly attachable/removable from the receptacle.

17. The food preparation device of claim 13, further comprising a motor for driving the drive shaft.

18. The food preparation device of claim 1, wherein the quick connect coupling comprises a polygonal key male component and a polygonal receiving female component.

* * * * *

UNITED STATES PATENT AND TRADEMARK OFFICE
CERTIFICATE OF CORRECTION

PATENT NO. : 9,975,097 B2  
APPLICATION NO. : 15/074182  
DATED : May 22, 2018  
INVENTOR(S) : Bizhong et al.

Page 1 of 1

It is certified that error appears in the above-identified patent and that said Letters Patent is hereby corrected as shown below:

In the Specification

Column 6, Line 18, delete "lid 4" and insert -- lid 10 --, therefor.

Columns 6 & 7, Lines 67 & 1, delete "drive shaft 18" and insert -- drive shaft 19 --, therefor.

Column 7, Lines 5-6, delete "drive shaft 18" and insert -- drive shaft 19 --, therefor.

Column 7, Line 12, delete "drive shaft 18" and insert -- drive shaft 19 --, therefor.

Column 7, Lines 17-18, delete "connector 24," and insert -- connector 25, --, therefor.

Column 7, Line 18, delete "connector 24" and insert -- connector 25 --, therefor.

Column 7, Line 20, delete "drive shaft 18" and insert -- drive shaft 19 --, therefor.

Column 7, Line 21, delete "connector 24." and insert -- connector 25. --, therefor.

Column 8, Line 6, delete "first leg 32" and insert -- first leg 34 --, therefor.

Column 8, Line 63, delete "casing 49." and insert -- casing 48. --, therefor.

Column 8, Line 65, delete "casing 51" and insert -- casing 48 --, therefor.

Column 9, Line 7, delete "casing 51." and insert -- casing 48. --, therefor.

In the Claims

Column 12, Line 20, Claim 11, delete "materials." and insert -- material. --, therefor.

Signed and Sealed this  
Second Day of October, 2018

Andrei Iancu  
*Director of the United States Patent and Trademark Office*